United States Patent [19]

Sato

[11] 3,713,269
[45] Jan. 30, 1973

[54] SEALING EQUIPMENT FOR A FILM WITH MEANS FOR HOLDING-UP END FLAPS THEREOF

[75] Inventor: Yoshimasa Sato, Yokohama, Japan

[73] Assignee: Ikegai Tekko Kabushiki Kaisha, Tokyo, Japan

[22] Filed: May 5, 1971

[21] Appl. No.: 140,488

[30] Foreign Application Priority Data

May 6, 1970 Japan ................................ 45/43528

[52] U.S. Cl. .................................................... 53/373
[51] Int. Cl. ............................................... B65b 7/06
[58] Field of Search ........ 53/229, 371, 373, 378, 180, 53/379

[56] References Cited

UNITED STATES PATENTS

| | | | |
|---|---|---|---|
| 3,517,479 | 6/1970 | Pinkham | ............................. 53/180 X |
| 3,481,107 | 12/1969 | Andblad et al. | ..................... 53/229 X |
| 3,643,396 | 2/1972 | Togashi et al. | ..................... 53/229 X |

Primary Examiner—Theron E. Condon
Assistant Examiner—Eugene F. Desmond
Attorney—Wenderoth, Lind & Ponack

[57] ABSTRACT

A sealing equipment enclosed is directed to a seal of the end flaps of a film which has been already sealed along at least one of opposed sides of an object to be packed. The sealing equipment comprises a pair of upper and lower seal bars movable into a sealing position where they pinch the end flaps of the film therebetween, and means for holding-up the end flaps to facilitate the sealing of the end flaps comprising a magnet member provided at least on the lower seal bar, and a holding-up member into a space defined by the end flaps and one end of the object before one of said seal bars is brought into the sealing position, said holding-up member being made of magnetic material so that when at least the lower seal bar with the magnet is moved into the sealing position, the holding-up member is attracted by the magnet member to hold up the end flaps of the film.

3 Claims, 20 Drawing Figures

PATENTED JAN 30 1973 3,713,269

YOSHIMASA SATO,
INVENTOR

BY Wenderoth, Lind & Ponack
ATTORNEYs

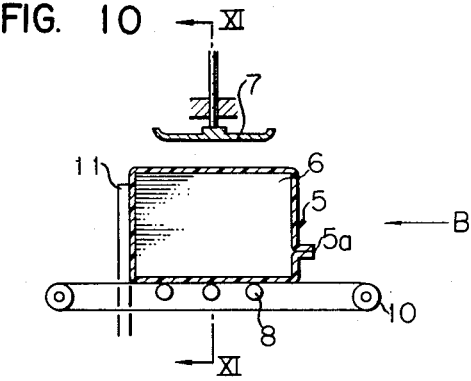
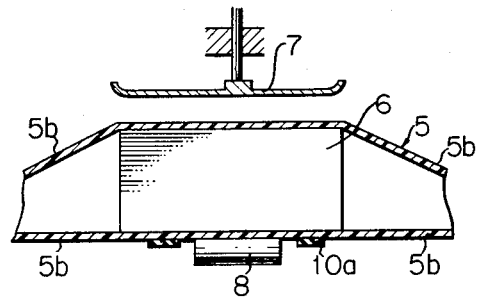
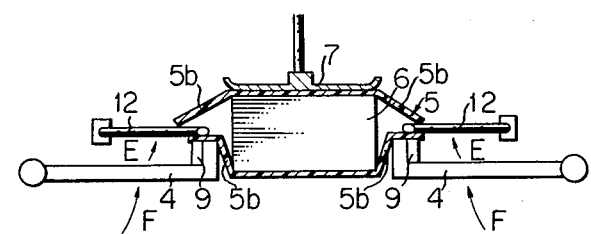
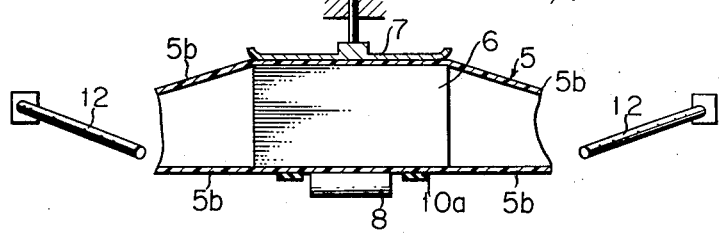
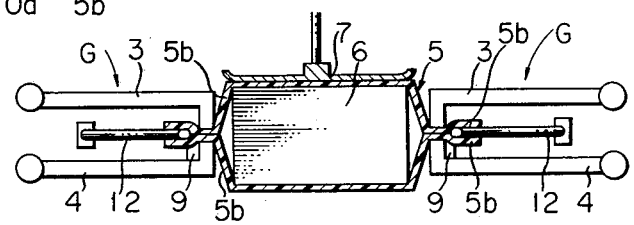
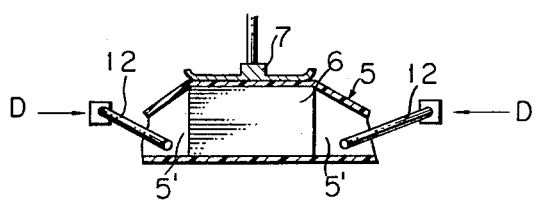
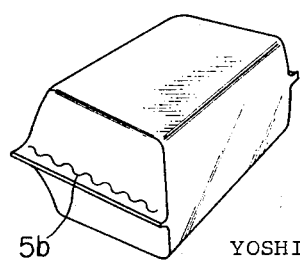
YOSHIMASA SATO,
INVENTOR

3,713,269

SEALING EQUIPMENT FOR A FILM WITH MEANS FOR HOLDING-UP END FLAPS THEREOF

Background of the Invention

This invention relates broadly to a compression packaging machine and in particular to an automatic sealing of meeting film edges in the machine described above. When the film wrapping an object to be packed is sealed along, for example, the front of the object to pack the object therein, the film is formed in a hollow shape with opposed open ends. Therefore, such a sealing of the meeting film edges is needed to close the open ends of the film to complete the sealing and packing of the object.

Recently, a compression packaging machine has been often used to pack an object such, for example, as sanitary cottons and a stack of printed matter, such as, news papers and magazines while compressing the same. Such a compression packaging machine includes a first sealing equipment to first secure a pair of opposite ends of a film along the back of the object to be packed, which equipment comprises a pair of lower and upper conveyers and a pair of upper and lower seal bars. The object to be packed is fed under compression between the pair of lower and upper conveyers to pass across the tensioned film arranged perpendicular to the direction of the travel of the object to be packed, whereby the front, back, top and bottom of the object are wrapped by the film, then the overlapping ends of the film are secured together along the back of the object by means of a heat seal with the said pair of lower and upper seal bars which approach toward each other when sealing. Therefore, in order to finish packing the object, it is needed to further seal the open sides of the film For the purpose, it has been practised to secure the overlapping end flaps of the film by means of a spot heat seal after suitably folding the end flaps of the film, or any suitable manner after deforming the end flaps of the film at random. However, these sealing methods are disadvantageous in that, for example, a mechanism for folding the end flaps of the film is of complicated construction and the portions of the film secured by the spot heat seal are poor in seal strength and it is difficult to effect a complete sealing of the film.

What is therefore needed is a means for facilitating sealing of the end flaps of the film, of which back flaps have been already secured together along the back of the object to be packed.

BRIEF SUMMARY OF THE INVENTION

It is accordingly an object of the present invention to provide a means capable of meeting the above need and allowing a stable, ideal sealing of the open sides of the film.

According to the present invention, the above and other objects can be achieved by a sealing equipment for a film with means to hold up end flaps thereof. The present sealing equipment is directed to a seal of the end flaps of the film which has been already sealed along at least one of the front, back, top and bottom of an object to be packed, and comprises upper and lower seal bars movable between an operative position where they pinch the end flaps of the film therebetween to effect the sealing thereof and an inoperative position, and means for holding-up the end flaps to facilitate the sealing thereof. The holding-up means comprises a magnet member at least on said lower seal bar, and a holding-up member movable into a space defined by said end flaps and one end of said object before one of the said seal bars is brought into said operative position. The holding-up member is made of magnetic material (or may be provided at a suitable portion with a permanent magnet) so that when at least the lower seal bar with the magnet is moved from the inoperative position to the operative position, the holding-up member and the magnet on the lower seal bar are attracted with each other while putting the end flaps between the lower seal bar and the holding-up member, thereby to hold up the end flaps of the film.

The magnet may be provided on the holding-up member instead of the lower seal bar. In this case, the lower seal bar has to be made of magnetic material.

BRIEF DESCRIPTION OF THE DRAWINGS

FIG. 10 is a diagrammatic view showing the object disposed in position on a conveyer forming a part of an automatic end flap sealing equipment according to the invention;

FIG. 11 is a transverse section, through the object, taken on the line XI — XI of FIG. 10;

FIGS. 12 to 15 are views showing successive steps of the automatic end flap sealing operation according to the invention; and FIG. 16 is a perspective view of the object which is perfectly sealed and packed.

DESCRIPTION OF THE PRIOR ART AND PREFERRED EMBODIMENTS

Prior to the description of the embodiments according to the present invention, a conventional system of sealing the end flaps of a film will be described in conjunction with FIGS. 1 to 9e for the understanding of the invention.

Figure 1:
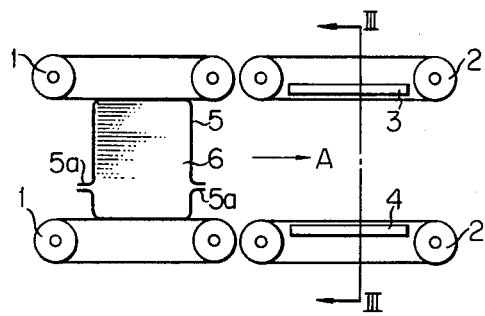
FIG. 1 is a diagrammatic side elevational view showing a construction of a conventional automatic sealing equipment.
Figure 2:
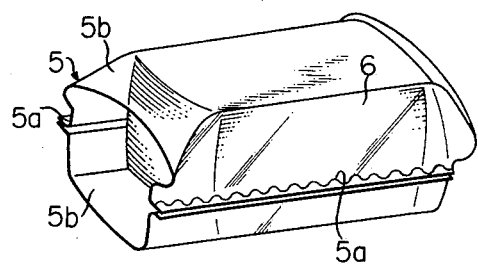
FIG. 2 is a perspective view of an object to be packed up by the automatic sealing equipment of FIG. 1, said object to be packed having a film wound therearound which film is sealed along the front and back of the object to be packed.
Figure 3:
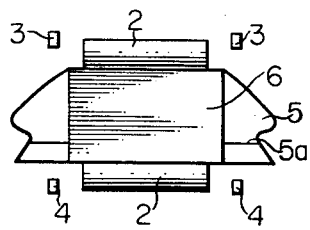
FIG. 3 is a sectional view of the equipment of FIG. 1 as viewed on the line III — III of FIG. 1, on a reduced scale.
Figure 4:
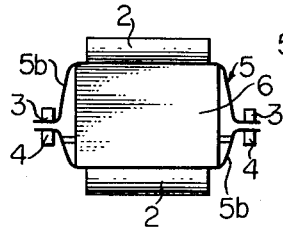
FIG. 4 is a section similar to that of FIG. 3, but the equipment being in operation to effect the sealing of meating end flaps of the film.
Figure 5:
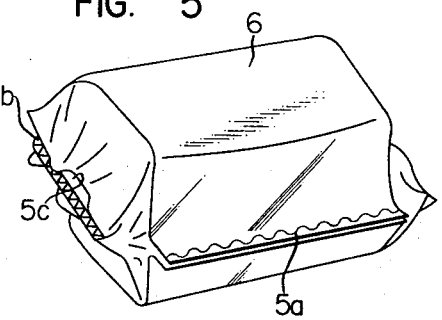
FIG. 5 is a perspective view similar to that of FIG. 2, but showing the object having been sealed completely.

Referring to FIG. 1, there is diagrammatically shown a sealing equipment comprising a first pair of conveyers 1,1 between which an object 6 to be wrapped in films 5 is positioned under compression to be fed in a direction A, i.e., toward a second pair of lower and upper conveyers 2,2. The films 5 have been already secured together along their forward and backward edges 5a by means of a heat seal. Then, between the second pair of conveyers 2,2, the not shown unsealed end flaps of the film are secured together by means of a heat seal with an upper seal bar 3 and a lower seal bar 4. The object 6 to be packed before its end flaps are sealed is of such a figure as shown in FIG. 2 and of a longitudinal section such as shown in FIG. 3. As shown in FIG. 4, in effecting the sealing of the end flaps 5b, the upper and lower seal bars 3 and 4 move toward each other to pinch the end flaps 5b of the film 5 therebetween, thereby to secure the overlapping end flaps 5b by means of the heat seal. In FIG. 5, the object 6 is shown with the forward and backward edges 5a and end flaps 5b of the film 5 being sealed up. A reference numeral 5c shows a portion of the film where the sealing is somewhat defective.

Figure 6:
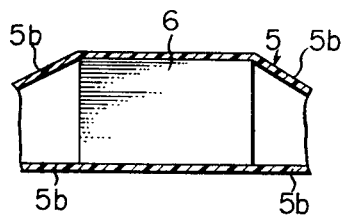
FIG. 6 is a diagrammatic longitudinal section of the object shown in FIG. 2.
Figure 7:
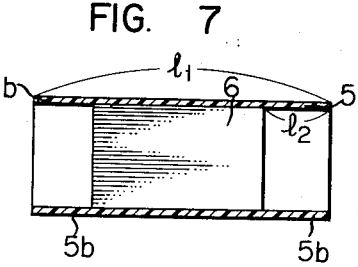
FIG. 7 is a view similar to that of FIG. 6 except that the end flaps of the film are tensioned.
Figure 8:
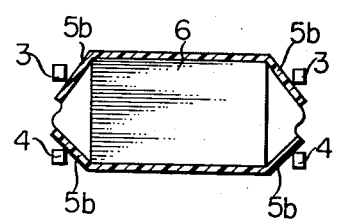
FIG. 8 is a diagrammatic sectional view showing mainly the object being in process of the end flap sealing thereof.

As shown in FIG. 6, the lefthand and righthand upper flaps 5b of the film 5 after only its forward and backward edges 5a have been sealed up both hang down as illustrated due to their own weight. When it is desired to seal the end flaps 5b of the film 5, the upper and lower seal bars 3 and 4 are moved toward each other along the associated end flaps 5b after tensioning the end flaps 5b as shown in FIG. 7 in any suitable mechanical manner or without tensioning, thereby to allow the end flaps 5b to be securely pinched between the upper and lower seal bars 3 and 4 as shown in FIG. 9e.

Figure 9A:
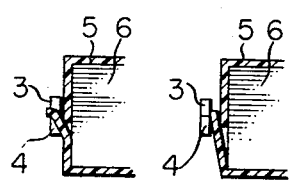
FIGS. 9a to 9e show various examples of the end portion of the object failing in the end flap sealing.
Figure 9B:
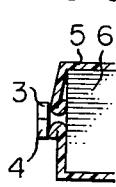
Figure 9C:

However, the fact is that the end flaps 5b are not always secured as desired, because when the end flaps are being bent inwards by the frictional engagement with the upper and lower seal bars 3 and 4, the end flaps are apt to crease irregularly and consequently change in stiffness and in profile of the edges thereof, with the result that a portion or portions of the end flaps remains unsealed as shown in FIGS. 9a, 9b and 9c at the time point when the upper and lower seal bars 3 and 4 face each other.

Figure 9D:
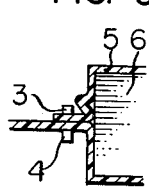
Figure 9E:
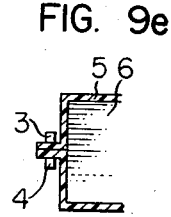

Additionally, if the end flap 5b has a relatively long length $l_2$ (FIG. 7), the end flaps 5b can be fully secured as shown in FIG. 9d while the figure is bad. In this case, an overall length $l_1$ of the film 5 is so much lengthened, resulting in an increase of film expenses and a large size of the sealing equipment for sealing the backward edges of the film.

This invention contemplates eliminating the abovedescribed disadvantages to effect a perfect sealing of the end flaps of the back sealed film.

Secondly, the preferred embodiment according to the invention will be described hereinafter in conjunction with FIGS. 10 to 16. Referring to FIG. 10, the object 6 to be packed about which the film 5 sealed along its meeting backward edges by a sealing equipment (not shown) has been wound is transferred in a direction B to be fed to an automatic film end-flap sealing device, in which the object 6 rides on a conveyer 10 to thereby travel until it bears upon a stop 11. The conveyer 10 is adapted to stop when the object 6 reaches the stop 11 to set a position of the object 6. The cross section as viewed on the line XI — XI of FIG. 10 is shown in FIG. 11, from which it is seen that the upper end flaps 5b of the film 5 extending respectively in the opposite directions are bent down due to their own weight.

The object 6 to be packed in the stop position of FIG. 10 is pressed down by a pressure plate 7 when it descends in a direction C as shown in FIG. 12. The vertical movement of the pressure plate 7 is caused by a force exerted from a suitable mechanism and this force exerted on the object 6 is received by a plurality of rollers 8 flush with a pair of conveyer belts 10a spaced a distance to put the rollers 8 therebetween. Close to the end flaps 5b of the film 5 are a pair of movable holding-up members 12 made of magnetic material such, for example, as Fe, Ni, Co, and their alloys. If desired, the holding-up member may be provided with a magnet instead of being made of the magnetic material.

When it is desired to secure the upper and lower end flaps 5b together, the holding-up members 12 are moved in a suitable manner in the opposite directions D so that their free end portions are inserted through the openings into associated spaces 5' defined by the upper and lower end flaps 5b of the film 5 and one end of the object 6. This state is shown in FIG. 13. After the holding-up members 12 are disposed in the respective predetermined positions in the above manner, each lower seal bar 4 is first turned in a direction F (FIG. 14). At this time, a magnet 9 mounted on the lower seal bar 4 attracts the associated holding-up member 12 through the lower end flap 5b of the film. Therefore, after the holding-up member 12 is attracted by the magnet 9, the holding-up member 12 and the lower seal bar 4 are moved upwardly as a whole while pinching the lower end flap 5b therebetween. As a result, the holding-up member 12 is also turned in a direction E. Then, the upper seal bars 3 (FIG. 15) are moved in a direction G so that the upper and lower end flaps 5b of the film are secured together by the heat seal. As the upper and lower end flaps 5b are guided by the holding-up member 12 when the seal bars 3 and 4 are turned in the directions G and F respectively, the failures of the heat seal as exemplified in FIGS. 9a to 9c never occur. The object 6 thus packed is of a good figure as shown in FIG. 16 because the end flaps 5b are secured together perfectly and surely.

From the foregoing, it will be understood that, according to the invention, when effecting the sealing of the end flaps, the end flaps are adapted to fold inwards while being guided by the seal bar and the holding-up member attracted by the magnet mounted on the seal bar, so that the upper and lower end flaps immediately before they are secured together are surely overlapped each other.

In the illustrated embodiment, although only the lower seal bar is provided with the magnet, it is of course that the upper seal bar also may have a similar magnet.

While the invention has been illustrated and described with reference to a single preferred embodiment thereof, it is to be understood that various changes in the details of constructions and the arrangement and combination of parts may resorted to without departing from the spirit and scope of the invention.

What I claim is:

1. In a sealing equipment for securing end flaps of a film which has been already sealed along at least the back of an object to be wrapped in said film, having upper and lower seal bars movable between an operative position in which they pinch said end flaps of said back sealed film therebetween to effect the sealing thereof and an inoperative position, and means for holding-up said end flaps to facilitate the sealing of said end flaps, said holding-up means comprising a holding-up member movable into a space defined by said end flaps and one end of said object before one of said seal bars is brought into said operative position, and a pair of magnets provided, respectively, on said lower seal bar and said holding-up member, whereby when said lower seal bar is moved from said inoperative position to said operative position, said holding-up member and said lower seal bar attract with each other thereby to hold up said end flaps of said film.

2. In a sealing equipment for securing end flaps of a film which has been already sealed along at least the back of an object to be wrapped in said film, having upper and lower seal bars movable between an operative position in which they pinch said end flaps of said back sealed film therebetween to effect the sealing thereof and an inoperative position, and means for holding-up said end flaps to facilitate the sealing of said end flaps, said holding-up means comprising a holding-up member movable into a space defined by said end flaps and one end of said object before one of said seal bars is brought into said operative position, and a magnet provided on one of said lower seal bar and said holding-up member, the other of said lower seal bar and said holding-up member being made of magnetic material so that when said lower seal bar with said magnet is moved from said inoperative position to said operative position, said holding-up member and said lower seal bar attract with each other while putting said end flaps therebetween, thereby to hold up said end flaps.

3. A sealing equipment according to claim 2, wherein said magnet is a permanent magnet.

* * * * *